(12) United States Patent
Tanel

(10) Patent No.: US 10,066,178 B2
(45) Date of Patent: Sep. 4, 2018

(54) METHOD OF INFUSING WOOD GRILLING PRODUCTS WITH FLAVOR AND AROMA-ENHANCING SUPPLEMENTS

(71) Applicant: David J. Tanel, Folsom, CA (US)

(72) Inventor: David J. Tanel, Folsom, CA (US)

( * ) Notice: Subject to any disclaimer, the term of this patent is extended or adjusted under 35 U.S.C. 154(b) by 94 days.

(21) Appl. No.: 15/162,896

(22) Filed: May 24, 2016

(65) Prior Publication Data

US 2016/0348021 A1     Dec. 1, 2016

Related U.S. Application Data

(60) Provisional application No. 62/166,415, filed on May 26, 2015.

(51) Int. Cl.
*C10L 5/44* (2006.01)
*C10L 5/36* (2006.01)

(52) U.S. Cl.
CPC .............. *C10L 5/442* (2013.01); *C10L 5/368* (2013.01); *C10L 2230/10* (2013.01); *C10L 2290/22* (2013.01); *Y02E 50/10* (2013.01); *Y02E 50/30* (2013.01)

(58) Field of Classification Search
CPC combination set(s) only.
See application file for complete search history.

(56) References Cited

U.S. PATENT DOCUMENTS

| | | | |
|---|---|---|---|
| 4,095,957 A * | 6/1978 | Orsing | A23B 4/044 206/497 |
| 2004/0089231 A1* | 5/2004 | Gilmore | B05C 3/02 118/425 |
| 2013/0202746 A1* | 8/2013 | Siegel | A23L 1/22025 426/103 |

* cited by examiner

*Primary Examiner* — Ellen McAvoy
*Assistant Examiner* — Chantel Graham

(57) ABSTRACT

A method of infusing wood grilling products with flavor and aroma-enhancing supplements is utilized to impart flavor and aroma to a wood grilling product that is to be used for cooking. The wood grilling product is placed into a vacuum infusion chamber and submerged within a first quantity of FAE liquid. The first quantity of FAE liquid and the wood grilling product are then hermetically sealed within the vacuum infusion chamber. A first quantity of air is evacuated out of the vacuum infusion chamber in order to apply a vacuum to the wood grilling product. The vacuum is maintained on the wood grilling product for an optimal time duration. A second quantity of air is then introduced into the vacuum infusion chamber in order to return the vacuum infusion chamber to atmospheric pressure and infuse the first quantity of FAE liquid into the wood grilling product.

11 Claims, 16 Drawing Sheets

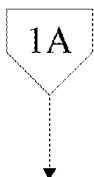

(F) Evacuating a first quantity of air out of the vacuum infusion chamber and the wood grilling product in order to apply a vacuum to the wood grilling product (G) Maintaining the vacuum on the wood grilling product for an optimal time duration (H) Introducing a second quantity of air into the vacuum infusion chamber in order to infuse the first quantity of FAE liquid into the wood grilling product

FIG. 1B

Designating the optimal time duration by assessing a plurality of physical properties for the wood grilling product, for the first quantity of FAE liquid, and for the vacuum infusion chamber

FIG. 2

Designating an optimal barometric vacuum pressure for the vacuum infusion chamber in order to evacuate the first quantity of air from the wood grilling product during step (F)

FIG. 3

Executing steps (F) through (H) for a plurality of desired iterations

FIG. 4

Wherein the sealable package is composed of polyethylene

FIG. 6

Vertically adjusting the at least one crossbar within the vacuum infusion chamber in order to restrain each of the plurality of planks beneath a top surface of the first quantity of FAE liquid

FIG. 8

Vertically adjusting the grid panel within the vacuum infusion chamber in order to restrain each of the plurality of chunks or each of the plurality of chips beneath a top surface of the first quantity of FAE liquid

FIG. 10

Providing at least one food preservative agent

Compositionally integrating the at least one food preservative agent with the first quantity of FAE liquid

METHOD OF INFUSING WOOD GRILLING PRODUCTS WITH FLAVOR AND AROMA-ENHANCING SUPPLEMENTS

The current application claims a priority to the U.S. Provisional Patent application Ser. No. 62/166,415 filed on May 26, 2015.

FIELD OF THE INVENTION

The present invention relates generally to a method for infusing a wood product. More specifically, the present invention is a method of infusing wood grilling products with flavor and aroma-enhancing supplements.

BACKGROUND OF THE INVENTION

When grilling food, it is common to utilize wood as both a fuel source for heat as well as a surface upon which food may be placed during cooking. In addition to serving as a cooking surface, wood is additionally able to impart flavor and aroma on the cooking food as well as prevent the food from burning, allow for even cooking, and prevent the food from drying out. Because of the desirable effects of cooking on wood, wood is often introduced when utilizing a conventional charcoal, gas, or electric grill in order to recreate the effects of cooking on wood. Grilling planks, wood chips, and wood chunks are the most common supplements that are utilized. Dry grilling planks are often commercially available. However, because dry wood is easily combustible upon exposure to fire or heat, it is typically recommended that grilling planks be soaked in water prior to grilling to minimize the likelihood of ignition of the wood. Grilling planks are thus soaked in water or another appropriate medium for an amount of time prior to grilling. Effectiveness of soaking is influenced by a number of factors such as the duration of soaking, the wood species, wood characteristics (porosity, density, etc.), type of liquid medium, and soaking technique. Various types of wood species may be utilized for grilling including, but not limited to, cedar, alder, hickory, mesquite, and cherry. These wood species are porous with millions of tiny air-filled cells per cubic inch. As a result, simply soaking grilling planks of these wood species does not allow for the wood to be optimally permeated nor for the air within the cells to be displaced properly within a practical amount of time.

The present invention is a method of infusing wood grilling products with flavor and aroma-enhancing supplements. Within the context of the present invention, a wood grilling product is submerged within a liquid that is able to impart flavor and aroma to the wood grilling product. The wood grilling product and the liquid are positioned within a vessel that is then sealed. A vacuum is applied to the wood grilling product and the liquid by evacuating the air from within the vessel, causing the air within the porous wood to be drawn out. The vacuum is then released and the vessel is returned to atmospheric pressure by introducing air into the vessel. The return to atmospheric pressure causes the liquid to be drawn into the wood, permeating the wood cells previously occupied by air with the liquid in order to effectively infuse the wood grilling product with the liquid.

BRIEF DESCRIPTION OF THE DRAWINGS

FIG. 1B is a continuation of the flowchart illustrated in FIG. 1A.

FIG. 2 is a flowchart illustrating the secondary process that is followed by the present invention when designating the optimal time duration.

FIG. 3 is a flowchart illustrating the secondary process that is followed by the present invention when designating the optimal barometric vacuum pressure.

FIG. 4 is a flowchart illustrating the secondary process that is followed by the present invention when repeating the infusion process for a plurality of desired iterations.

FIG. 6 is a flowchart illustrating the secondary process that is followed by the present invention when the sealable package is composed of polyethylene.

FIG. 8 is a flowchart illustrating the secondary process that is followed by the present invention when the plurality of planks is restrained within the first quantity of FAE liquid.

FIG. 10 is a flowchart illustrating the secondary process that is followed by the present invention when the plurality of chunks or the plurality of chips is restrained within the first quantity of FAE liquid.

DETAIL DESCRIPTIONS OF THE INVENTION

All illustrations of the drawings are for the purpose of describing selected versions of the present invention and are not intended to limit the scope of the present invention.

The present invention is a method of infusing wood grilling products with flavor and aroma-enhancing (FAE) liquid. The overall process that is followed by the present invention is shown in FIG. 1A and FIG. 1B while secondary processes that are followed by the present invention are shown in FIGS. 2-12.

Figure 1A:
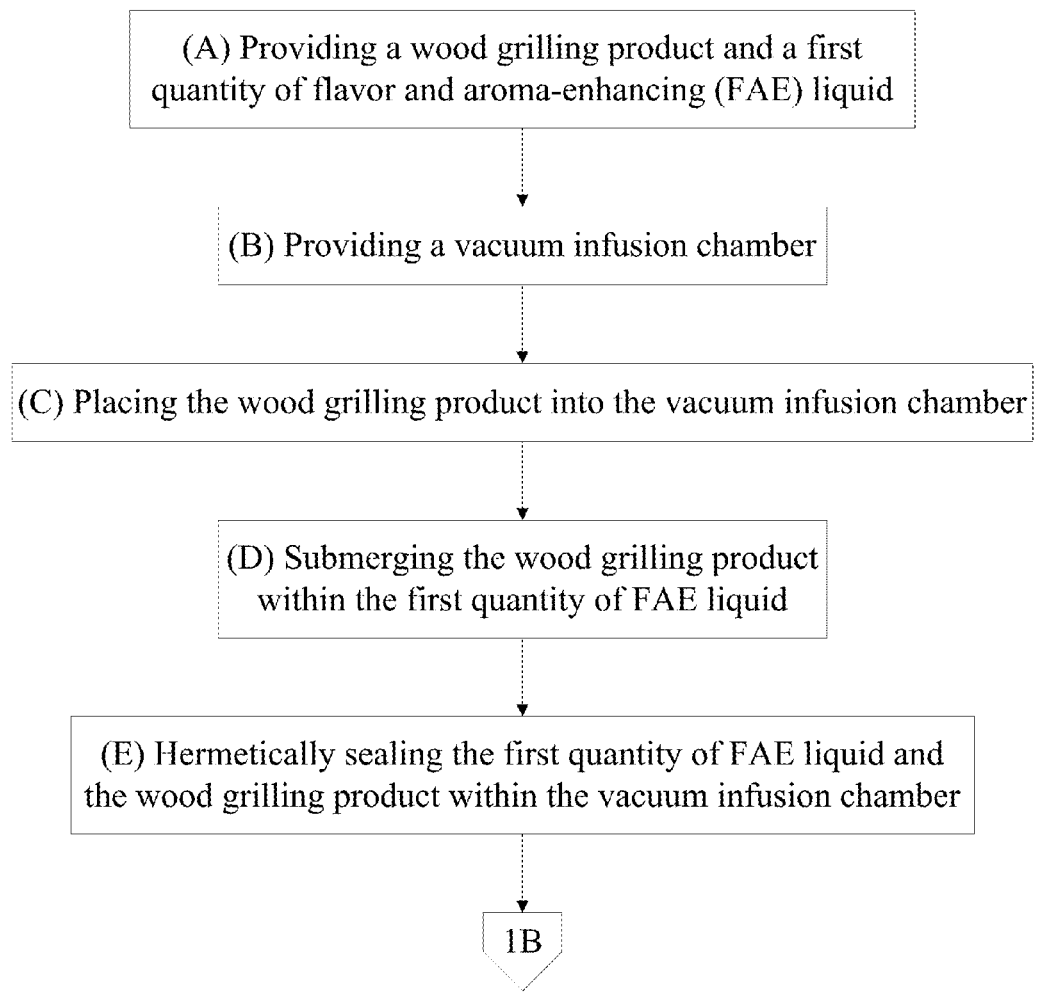
FIG. 1A is a flowchart illustrating the overall process that is followed by the present invention.

With reference to FIG. 1A and FIG. 1B, a wood grilling product is provided for infusion by a first quantity of FAE liquid. The first quantity of FAE liquid may be of any composition and is able to impart flavor and aroma to the wood grilling product that is then in turn imparted to food cooked using the wood grilling product. Examples of the first quantity of FAE liquid include, but are not limited to, water, brine, wine, beer, liquor, broth, syrup, cider, and fruit juice. A vacuum infusion chamber 1 is provided for infusing the first quantity of FAE liquid into the wood grilling product. The vacuum infusion chamber 1 is a vessel that may be sealed to be airtight and is sufficiently sized to accommodate various types and sizes of the wood grilling product. The wood grilling product is placed into the vacuum infusion chamber 1 in order to enable the wood grilling product and the first quantity of FAE liquid to be placed into contact with each other on all surfaces. Perforations may be made onto the surfaces of the wood grilling product in order to aid in infusing the first quantity of FAE liquid. The wood grilling product is then submerged within the first quantity of FAE liquid by dispensing the first quantity of FAE liquid into the vacuum infusion chamber 1. The wood grilling product is thus able to be infused with the first quantity of FAE liquid within the vacuum infusion chamber 1. Vacuum infusing the wood grilling product within the first quantity of FAE liquid allows the first quantity of FAE liquid to impart flavor and aroma to the wood grilling product and mitigates the combustion of the wood grilling product during cooking.

Figure 12:
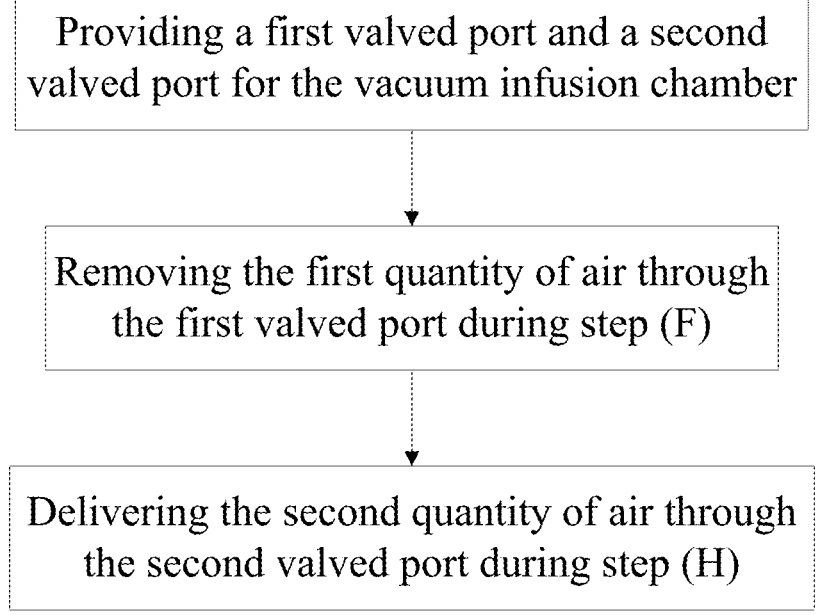
FIG. 12 is a flowchart illustrating the secondary process that is followed by the present invention when the first quantity of air is removed through the first valved port and the second quantity of air is delivered through the second valved port.
Figure 13:
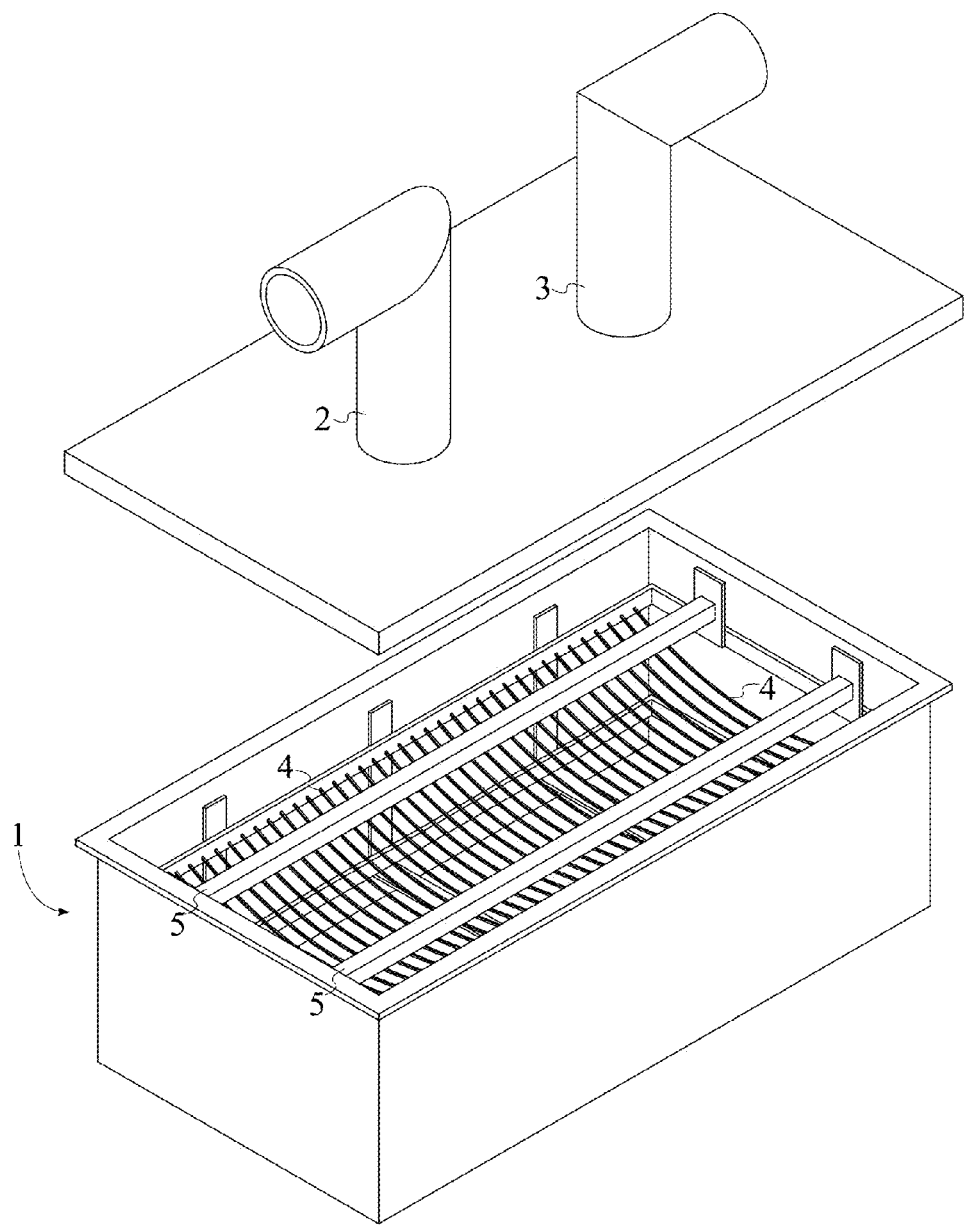
FIG. 13 is a perspective view of the vacuum infusion chamber and the lid configured for use when the wood grilling product is a plurality of planks.
Figure 14:
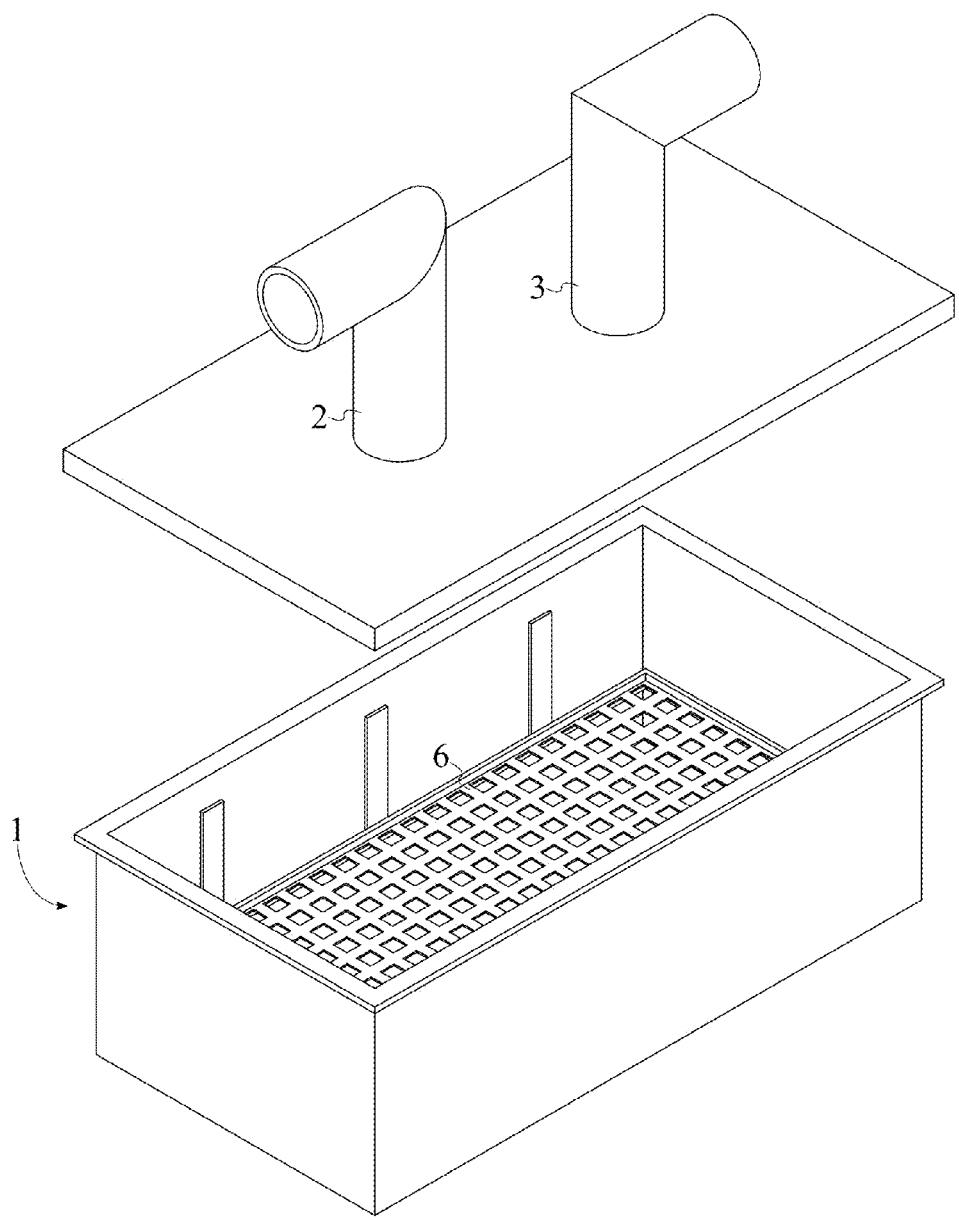
FIG. 14 is a perspective view of the vacuum infusion chamber and the lid configured for use when the wood grilling product is a plurality of chunks or a plurality of chips.

After the wood grilling product has been submerged within the first quantity of FAE liquid, the first quantity of FAE liquid and the wood grilling product are hermetically sealed within the vacuum infusion chamber 1. The first quantity of FAE liquid and the wood grilling product are thus isolated from the exterior environment in preparation of applying a vacuum to the vacuum infusion chamber 1. In the preferred embodiment of the present invention, a lid is utilized to hermetically seal the first quantity of FAE liquid and the wood grilling product within the vacuum infusion chamber 1. A first quantity of air is evacuated out of the vacuum infusion chamber 1 and the wood grilling product in order to apply a vacuum to the wood grilling product. In the preferred embodiment of the present invention, the lid comprises a first valved port 2 and a second valved port 3. Alternatively, the first valved port 2 and the second valved port 3 may be positioned directly on the vacuum infusion chamber 1. The first quantity of air is removed through the first valved port 2 via a vacuum pump or similar mechanism as shown in FIGS. 12-14.

When the vacuum is applied to the wood grilling product and the first quantity of air is removed from the vacuum infusion chamber 1 and the wood grilling product, air contained within the structure of the wood grilling product is drawn out of the wood. The vacuum is maintained on the wood grilling product for an optimal time duration, resulting in an infusion process that is optimized for the specific wood grilling product. As shown in FIG. 2, in the preferred embodiment of the present invention, the optimal time duration is designated by assessing a plurality of physical properties for the wood grilling product, for the first quantity of FAE liquid, and for the vacuum infusion chamber 1. More specifically, the optimal time duration is designated based on a large number of factors including, but not limited to:

Volume of the wood grilling product
Species of the wood grilling product
Porosity of the wood grilling product
Volume of the first quantity of FAE liquid
Composition of the first quantity of FAE liquid
Viscosity of the first quantity of FAE liquid
Volumetric capacity of the vacuum infusion chamber 1

In addition to the optimal time duration, an optimal barometric vacuum pressure for the vacuum infusion chamber 1 is designated as well as shown in FIG. 3. The optimal barometric vacuum pressure relates to the required pressure in order to evacuate the first quantity of air from the wood grilling product. This enables the first quantity of air to be drawn out of the wood grilling product prior to the infusion of the first quantity of FAE liquid into the structure of the wood grilling product.

Following the optimal time duration, a second quantity of air is introduced into the vacuum infusion chamber 1 in order to infuse the first quantity of FAE liquid into the wood grilling product. The introduction of the second quantity of air into the vacuum infusion chamber 1 returns the interior of the vacuum infusion chamber 1 to atmospheric pressure and causes a volume of the first quantity of FAE liquid to be drawn into the structure of the wood grilling product previously occupied by the first quantity of air, thus infusing the first quantity of FAE liquid into the wood grilling product. The first quantity of FAE liquid is thus infused into the wood grilling product, ensuring that the wood grilling product is able to more effectively retain the first quantity of FAE liquid. In the preferred embodiment of the present invention, the second quantity of air is delivered through the second valved port 3 as shown in FIGS. 12-14.

The steps of evacuating the first quantity of air out of the vacuum infusion chamber 1 and the wood grilling product, maintaining the vacuum, and introducing the second quantity of air into the vacuum infusion chamber 1 may be executed for a plurality of desired iterations as shown in FIG. 4. These steps may be repeated for the plurality of desired iterations based on the plurality of physical properties for the wood grilling product, the first quantity of FAE liquid, and for the vacuum infusion chamber 1.

Figure 5:
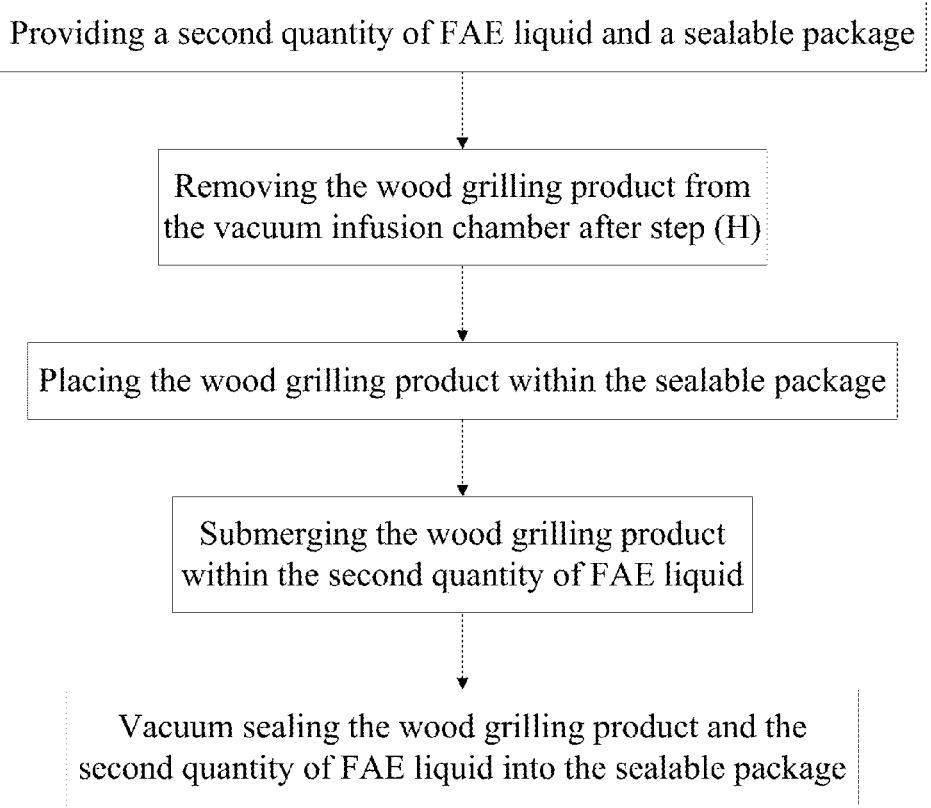
FIG. 5 is a flowchart illustrating the secondary process that is followed by the present invention when vacuum sealing the wood grilling package into the sealable package.
Figure 15:
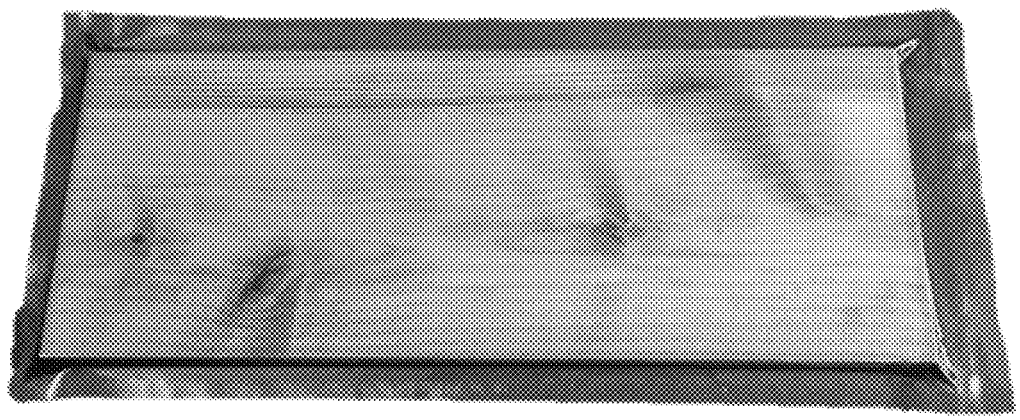
FIG. 15 is an example of the wood grilling product within the sealable package.

With reference to FIG. 5 and FIG. 6, following the infusion process, the wood grilling product may be individually packaged. In the preferred embodiment of the present invention, the wood grilling product is packaged in a manner such that the flavor and aroma imparted to the wood grilling product during the infusion process is maintained until the wood grilling product is ready for use. A second quantity of FAE liquid and a sealable package are provided. The composition of the second quantity of FAE liquid is the same as the composition of the first quantity of FAE liquid and is utilized to maintain the flavor and aroma infused into the wood grilling product when the wood grilling product is within the sealable package. An example of the wood grilling product within the sealable package is shown in FIG. 15.

The wood grilling product is removed from the vacuum infusion chamber 1 after the second quantity of air is introduced into the vacuum infusion chamber 1 for packaging. The wood grilling product is placed within the sealable package in order to augment and sustain the infused state of the wood grilling product infused with the first quantity of FAE liquid. The infused state of the wood grilling product is maintained in order to mitigate combustion of the wood grilling product during cooking as well as to eliminate the need to soak the wood grilling product for a duration of time immediately prior to use during cooking. The wood grilling product is submerged within the second quantity of FAE liquid in order to augment the infusion process for the wood grilling product within the sealable package until the wood grilling product is ready for use during cooking. The wood grilling product and the second quantity of FAE liquid are then vacuum sealed into the sealable package in order to isolate the wood grilling product and the second quantity of FAE liquid from the exterior environment and maintain the infused state of the wood grilling product. The vacuum sealing of the wood grilling product and the second quantity of FAE liquid within the sealable package also eliminates the possibility of evaporation of the second quantity of FAE liquid and additionally removes ambient oxygen, subsequently inhibiting biological growth and extending shelf life of the wood grilling product.

In the preferred embodiment of the present invention, the sealable package is composed of polyethylene for convenient removal of the wood grilling product from the sealable package. The present invention is not limited with respect to the material of the sealable package. However, it is important to ensure that the sealable package is composed of a material that is capable of maintaining a hermetic vacuum seal after the wood grilling product and the second quantity of FAE liquid have been inserted into the sealable package.

Figure 7:
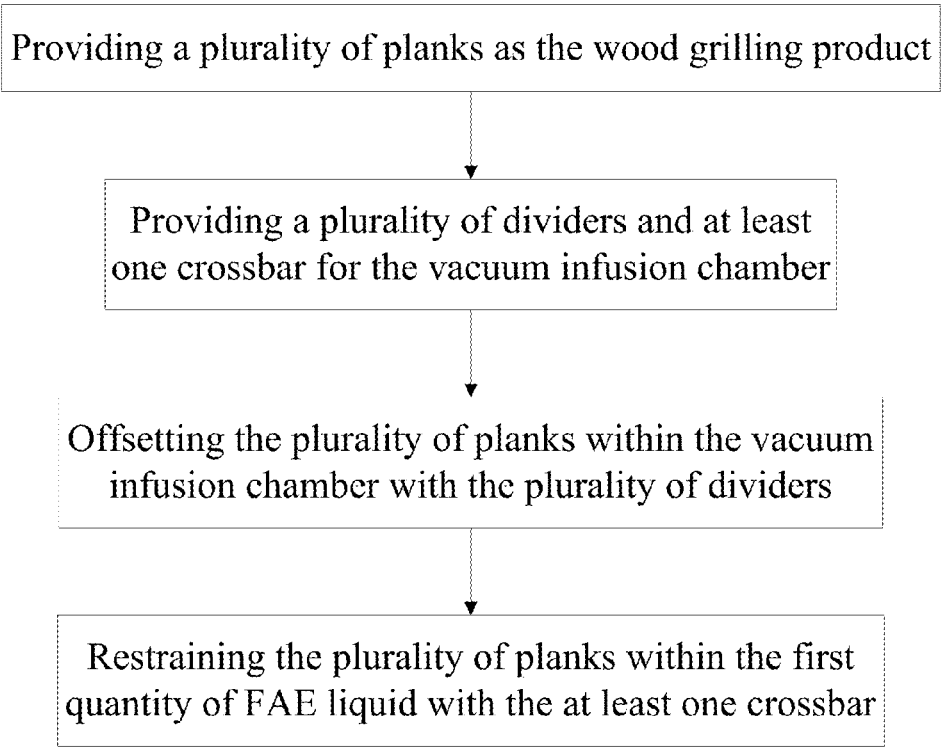
FIG. 7 is a flowchart illustrating the secondary process that is followed by the present invention when the wood grilling product is a plurality of planks.

The present invention is applicable to various types of the wood grilling product. With reference to FIG. 7 and FIG. 8, a plurality of planks is provided as the wood grilling product. Additionally, a plurality of dividers 4 and at least one crossbar 5 for the vacuum infusion chamber 1 are provided. The plurality of dividers 4 is utilized to provide full surface exposure to the first quantity of FAE liquid for the plurality of planks within the vacuum infusion chamber 1. The at least one crossbar 5 is utilized to brace the plurality of planks in place within the vacuum infusion chamber 1 and ensure that the plurality of planks remains fully submerged within the first quantity of FAE liquid during the infusion process. The plurality of planks is offset within the vacuum infusion chamber 1 with the plurality of dividers 4. The plurality of dividers 4 is thus able to provide spacing between each of the plurality of planks. The plurality of planks is restrained within the first quantity of FAE liquid with the at least one crossbar 5. This ensures that the plurality of planks remains stationary and fully submerged within the first quantity of FAE liquid during the infusion process. In the preferred embodiment of the present invention, the at least one crossbar 5 is vertically adjusted within the vacuum infusion chamber 1 in order to restrain each of the plurality of planks beneath a top surface of the first quantity of FAE liquid. The adjustability of the at least one crossbar 5 allows the at least one crossbar 5 to accommodate various sizes and shapes of the plurality of planks during the infusion process within the vacuum infusion chamber 1.

Figure 9:
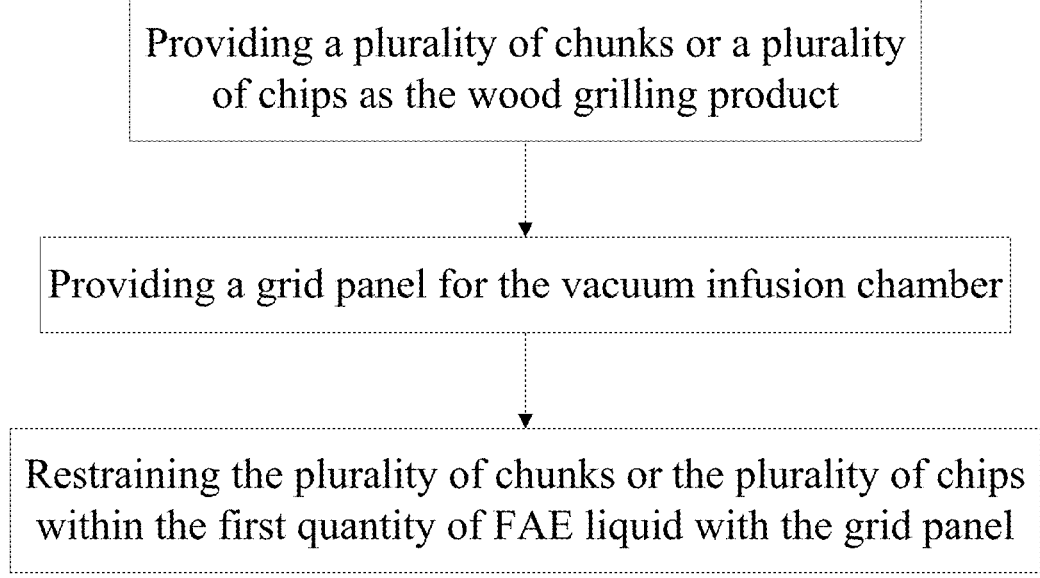
FIG. 9 is a flowchart illustrating the secondary process that is followed by the present invention when the wood grilling product is a plurality of chunks or a plurality of chips.
Figure 11:
FIG. 11 is a flowchart illustrating the secondary process that is followed by the present invention when the at least one food preservative agent is compositionally integrated with the first quantity of FAE liquid.

With reference to FIG. 9 and FIG. 10, a plurality of chunks or a plurality of chips is provided as the wood grilling product. A grid panel 6 is additionally provided for the vacuum infusion chamber 1. The grid panel 6 is utilized to ensure that the plurality of chunks or the plurality of chips remains submerged within the first quantity of FAE liquid. Because the plurality of chunks and the plurality of chips are physically much smaller than the plurality of planks, the grid panel 6 is utilized in lieu of the at least one crossbar 5 in this example. The plurality of chunks or the plurality of chips is restrained within the first quantity of FAE liquid with the grid panel 6, ensuring that the plurality of chunks or the plurality of chips is able to remain fully submerged within the first quantity of FAE liquid during the infusion process. As with the at least one crossbar 5, the grid panel 6 is vertically adjusted within the vacuum infusion chamber 1 in order to restrain each of the plurality of chunks or each of the plurality of chips beneath a top surface of the first quantity of FAE liquid. This adjustability allows the grid panel 6 to accommodate various quantities of the plurality of chunks or the plurality of chips as well as various volumes of the first quantity of FAE liquid.

In addition to imparting flavor and aroma to the wood grilling product, the first quantity of FAE liquid may serve in a preservative capacity. As such, with reference to FIG. 11, at least one food preservative agent is provided. The at least one food preservative agent is compositionally integrated with the first quantity of FAE liquid, providing the effects and benefits of the at least one food preservative agent to the first quantity of FAE liquid. The at least one food preservative agent may serve multiple purposes. For example, the at least one food preservative agent may inhibit the growth of bacteria and mold as well as mitigate fermentation when the wood grilling product is within the sealable package.

Although the present invention has been explained in relation to its preferred embodiment, it is understood that many other possible modifications and variations can be made without departing from the spirit and scope of the present invention as hereinafter claimed.

What is claimed is:

1. A method of infusing wood grilling products with water or other aromatic liquid comprising the steps of:
   (A) providing a plurality of wood grilling products and a first quantity of liquid;
   (B) providing a vacuum infusion chamber containing the first quantity of liquid;
   (C) placing a rack fixture containing the plurality of wood grilling products into the vacuum infusion chamber, and securing the rack fixture, such that all surfaces of the plurality of wood grilling products are exposed to the first quantity of liquid and are submerged within the first quantity of liquid;
   (D) hermetically sealing the vacuum infusion chamber containing the first quantity of liquid and the plurality of wood grilling products;
   (E) evacuating a first quantity of air out of the vacuum infusion chamber in order to extract a maximal quantity of air from tissues, fibers and crevices of an entire cross-section of each of the plurality of wood grilling products while the plurality of wood grilling products are submerged and restrained beneath a top surface of the first quantity of liquid;
   (F) maintaining a vacuum on the plurality of wood grilling products at an optimal negative pressure and for an optimal time duration while the plurality of wood grilling products are submerged and restrained beneath the top surface of the first quantity of liquid;
   (G) obtaining a plurality of infused wood grilling products by introducing a second quantity of air into the vacuum infusion chamber in order to restore the vacuum infusion chamber to an atmospheric pressure so as to infuse a portion of the first quantity of liquid into the tissues, fibers and crevices of the entire cross-section of each of the plurality of wood grilling products while the plurality of wood grilling products are submerged and restrained beneath the top surface of the first quantity of liquid;
   (H) opening the vacuum infusion chamber to facilitate unrestraining and removal of the rack fixture containing the plurality of infused wood grilling products;
   (I) individually transferring each of the plurality of infused wood grilling products from the rack fixture to a corresponding vacuum-sealable pouch among a plurality of vacuum-sealable pouches each containing a second quantity of liquid; and
   (J) vacuum-sealing each of the plurality of vacuum-sealable pouches containing a corresponding infused wood grilling product among the plurality of infused wood grilling products and a corresponding second quantity of liquid among the plurality of second quantity of liquids by using a vacuum sealing machine so as to to augment and preserve the infused wood grilling product in an infused state until the infused wood grilling product is to be used.

2. The method of infusing wood grilling products with water or other aromatic liquid as claimed in claim 1 comprising the steps of:
designating the optimal time duration for each of the plurality of wood grilling products exposure to the vacuum, by assessing a plurality of physical properties of each of the plurality of wood grilling products, to include species density and a pre-infusion moisture content, as well as properties of an infusion liquid during step (E) and step (F).

3. The method of infusing wood grilling products with water or other aromatic liquid as claimed in claim 1 comprising the steps of:
designating an optimal barometric vacuum pressure for the vacuum infusion chamber by assessing a plurality of physical properties of each of the plurality of wood grilling products, to include species density and a pre-infusion moisture content, as well as properties of an infusion liquid in order to evacuate the first quantity of air from the tissues, the fibers and the crevices of the entire cross-section of each of the plurality of wood grilling products during step (E).

4. The method of infusing wood grilling products with water or other aromatic liquid as claimed in claim 1 comprising the steps of:
executing steps (E) through (G) for a plurality of desired iterations.

5. The method of infusing wood grilling products with water or other aromatic liquid as claimed in claim 1, wherein each of the plurality of vacuum-sealable pouches composed of polyethylene.

6. The method of infusing wood grilling products with water or other aromatic liquid as claimed in claim 1 comprising the steps of:
providing a plurality of planks as the plurality of wood grilling products;
providing a plurality of dividers and at least one crossbar for the vacuum infusion chamber;
offsetting the plurality of planks within the vacuum infusion chamber with the plurality of dividers so as to expose all six surfaces of each of the plurality of planks to the first quantity of liquid; and
restraining the plurality of planks beneath the top surface of the first quantity of liquid with the at least one crossbar.

7. The method of infusing wood grilling products with water or other aromatic liquid as claimed in claim 6 comprising the steps of:
vertically adjusting the at least one crossbar within the vacuum infusion chamber in order to restrain each of the plurality of planks beneath the top surface of the first quantity of liquid.

8. The method of infusing wood grilling products with water or other aromatic liquid as claimed in claim 1 comprising the steps of:
providing a plurality of chunks or a plurality of chips as the plurality of wood grilling products;
providing a grid panel for the vacuum infusion chamber; and
restraining the plurality of chunks or the plurality of chips beneath the top surface of the first quantity of liquid with the grid panel.

9. The method of infusing wood grilling products water or other aromatic liquid as claimed in claim 8 comprising the steps of:
vertically adjusting the grid panel within the vacuum infusion chamber in order to restrain each of the plurality of chunks or each of the plurality of chips beneath the top surface of the first quantity of liquid.

10. The method of infusing wood grilling products with water or other aromatic liquid as claimed in claim 1 comprising the steps of:
providing at least one chemical agent to mitigate bacterial growth and/or fermentation; and
compositionally integrating the at least one chemical agent with the first quantity of liquid and the second quantity of liquid.

11. The method of infusing wood grilling products with water or other aromatic liquid as claimed in claim 1 comprising the steps of:
providing a first valved port and a second valved port for the vacuum infusion chamber;
removing the first quantity of air through the first valved port during step (E); and
delivering the second quantity of air through the second valved port during step (G).

* * * * *